United States Patent
Thienel

(10) Patent No.: US 8,444,733 B2
(45) Date of Patent: May 21, 2013

(54) FILTER DEVICE, ESPECIALLY AIR FILTER

(75) Inventor: Michael Thienel, Thurnau (DE)

(73) Assignee: Mann+Hummel GmbH, Ludwigsburg (DE)

( * ) Notice: Subject to any disclaimer, the term of this patent is extended or adjusted under 35 U.S.C. 154(b) by 534 days.

(21) Appl. No.: 12/609,848

(22) Filed: Oct. 30, 2009

(65) Prior Publication Data

US 2010/0107580 A1   May 6, 2010

(30) Foreign Application Priority Data

Oct. 31, 2008   (DE) .................... 20 2008 014 511 U

(51) Int. Cl.
*B01D 46/00* (2006.01)
(52) U.S. Cl.
USPC ............... 55/480; 55/385.3; 55/495; 55/503; 55/502; 55/507; 55/DIG. 31; 55/511
(58) Field of Classification Search
USPC ............... 55/480, 385.3, 495, 511, 503, 478, 55/481, 506, DIG. 31
See application file for complete search history.

(56) References Cited

U.S. PATENT DOCUMENTS

| | | | |
|---|---|---|---|
| 2006/0081528 A1* | 4/2006 | Oelpke et al. | 210/493.1 |
| 2006/0201744 A1* | 9/2006 | Curtis et al. | 182/138 |
| 2007/0209517 A1* | 9/2007 | Uemura et al. | 96/135 |

FOREIGN PATENT DOCUMENTS

| | | |
|---|---|---|
| DE | 19929062 A1 | 1/2001 |
| DE | 10034487 A1 | 1/2002 |
| EP | 0863785 | 9/1998 |
| EP | 0863785 B1 | 8/2008 |

\* cited by examiner

*Primary Examiner* — Duane Smith
*Assistant Examiner* — Karla Hawkins
(74) *Attorney, Agent, or Firm* — James Hasselbeck

(57) ABSTRACT

A filter device has a housing assembled of a housing bottom part and housing top part. A filter element is inserted into the housing and is made of a filter medium. A locking device connects the filter element with the housing bottom part and the housing top part in a mounted position of the filter element inside the housing. The locking device has a locking element connected to the filter element. The housing bottom part and the housing top part each have locking parts, wherein the locking element engages the locking parts on the housing bottom part and the housing top part.

10 Claims, 1 Drawing Sheet

FILTER DEVICE, ESPECIALLY AIR FILTER

CROSS REFERENCE TO RELATED APPLICATIONS

Priority is claimed based on Federal Republic of Germany patent application no. DE 202008014511.2 filed Oct. 31, 2008.

TECHNICAL FIELD

The invention relates to a filter device, in particular an air filter that is used preferably for filtration of intake air of an internal combustion engine.

BACKGROUND OF THE INVENTION

The invention relates to a filter device, in particular an air filter that is used preferably for filtration of intake air of an internal combustion engine, wherein the filter device comprises a filter element with a filter medium and further comprises a housing comprised of a housing bottom part and a housing top part, wherein the filter element is insertable into the housing.

A filter device for filtration of gaseous fluids is disclosed in EP 0 863 785 B1. The filter device comprises a filter element that is comprised of a zigzag-folded filter medium that is framed by a filter frame. The filter frame has circumferentially extending sealing pockets into which a silicone foam seal is molded.

Such filter elements are inserted into a housing having a housing bottom part and a housing top part or a lid, wherein the housing parts are to be connected to one another securely for preventing leakage flows. In order to apply the required contact pressure between the housing parts, screws, clamps or similar connecting elements between the housing parts are required.

SUMMARY OF THE INVENTION

It is an object of the invention to provide a filter device that, on the one hand, provides the required seal-tightness for avoiding leakage flows and, on the other hand, enables an exchange of the filter element in a simple way.

In accordance with the present invention, this is achieved in that a locking device is provided by means of which the filter element is locked in the mounted position at the housing bottom part as well as the housing top part.

The locking device comprises a locking element that is connected to the filter element and is capable of assuming a locking position at the housing bottom part as well as the housing top part.

The locking element on the filter element comprises detent hooks having correlated therewith locking eyes provided on the housing bottom part and on the housing top part.

Two detent hooks on a common hook support of the locking element are arranged on the filter element.

The locking elements and the locking parts are formed integrally with the filter element, the housing bottom part and the housing top part, respectively, especially by injection-molding as plastic parts.

The locking elements and the locking parts of the locking device are arranged on the exterior of the filter element and the housing parts, respectively.

At the end face of the housing bottom part and/or of the housing top part a groove is provided for the locking element provided on the filter element.

On opposed lateral edges of the filter element two locking elements each are arranged that have correlated therewith corresponding locking parts on the housing bottom part and the housing top part.

The filter element comprises a filter frame that frames the filter medium.

The filter element has the locking element arranged on the filter frame.

The locking element on the filter element is a support for a sealing element.

The filter device according to the invention is preferably an air filter, preferably for the filtration of intake air of internal combustion engines. However, a filtration of air to be conducted into the passenger compartment is also within the scope of the invention, for example. It is also possible to use the filter device according to the invention for the filtration of liquid fluids, for example, for fuel or oil filtration.

The filter device comprises a filter element with a filter medium that is flown through by the fluid to be filtered. Moreover, the filter device has a housing with a housing bottom part and a housing top part to be placed onto the housing bottom part, wherein the filter element is insertable into the housing. As a housing bottom part, for example, a housing cup can be employed; as a housing top part a lid can be used. The housing bottom part and housing top part may be designed to have approximately the same configuration.

Housing bottom part and housing top part are to be connected to one another by means of a connecting device wherein according to the invention it is provided that the connecting device is embodied as a locking device with a locking element that is arranged on the filter element and by means of which the filter element in its mounted position inserted in the housing is locked at the housing bottom part as well as the housing top part.

This embodiment has various advantages. Since the connection between the housing parts is realized by means of the locking device that at the same time secures the filter element in its mounted position, additional separately configured connecting elements between the housing parts are no longer needed. The locking device has therefore the double function to secure, on the one hand, the filter element in the desired position in the inserted state inside the housing and, on the other hand, to connect the two housing parts to one another. In principle, no additional connecting elements or separate locking devices for the fixation of the filter element in the inserted state inside the housing as well as for the pressure-tight or flow-tight connection of the two housing parts to one another are required. In this way, a reduction of parts is achieved that translates into a cost advantage. Moreover, mounting is simplified and an exchange of the filter element can be performed in a shorter period of time.

According to an advantageous embodiment, the locking device has a first locking element provided on the filter element; this locking element is configured to assume a locking position at the housing bottom part as well as the housing top part. Therefore, the filter element is provided with a common locking element for connecting the two housing parts to one another. In a preferred embodiment, this locking element has detent hooks whose complementary locking eyes are provided on the housing bottom part and the housing top part, respectively. For example, a common detent hook support can be provided that is connected to the filter element and has connected thereto, preferably two, detent hooks that are oriented upwardly and downwardly, respectively. The free ends of the detent hooks in the mounted position engage the locking eyes on the housing parts and are locked thereat. In this way, a snap connection between the detent hooks and the locking eyes is realized so that a desired fixed connection between each one of the housing parts and the locking element provided on the filter element is realized. In this way, the housing parts are not directly connected to one another but only by means of the locking element that is arranged on the filter element. Since however according to the preferred embodiment a single locking element is provided for the connection of the two housing parts, component elasticities no longer have any effect or have only a reduced effect so that a fixed, secure connection is provided.

According to a preferred embodiment, the filter element comprises in addition to the filter medium that serves for filtration of the fluid also a filter frame that at least partially, preferably completely, frames the filter medium. This filter frame is expediently also supports the locking element that is embodied, for example, as a plastic (synthetic) component and, in particular, is integrally injection-molded onto the filter frame and forms together with the filter frame a monolithic common injection-molded component. According to an alternative embodiment, it is in principle also possible that the locking element is connected directly to the filter medium.

In order to generate about the circumference of the housing a force as uniform as possible for connecting the housing parts, several locking elements are expediently distributed about the circumference on the filter element and have locking parts correlated therewith on the housing. It can be expedient that each of the four lateral edges of the filter element that is preferably rectangular is provided with one or several locking elements that interact with the correlated locking parts on the housing parts. According to a preferred embodiment, on two opposed lateral edges of the filter element two locking elements in the form of detent hooks are provided that interact with correlated locking eyes on the housing bottom part and on the housing top part. The detent hooks or the locking elements are located preferably on the longitudinal side of the filter element or of the housing. In this case, it may be sufficient to provide exclusively on the longitudinal sides such locking devices and to keep the narrow sides free of such locking devices.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
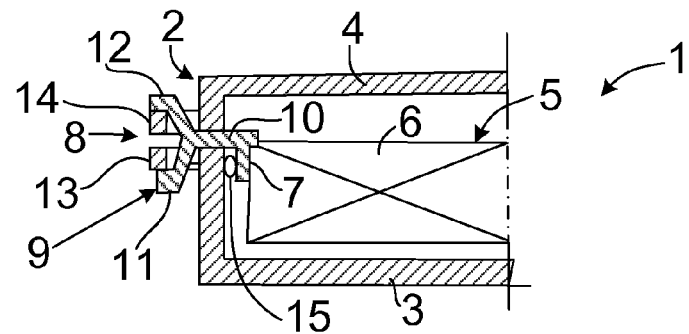
FIG. 1 shows a section of a filter device embodied as an air filter that comprises a filter element contained in a two-part filter housing wherein the filter element is secured by a locking device in its mounted position and at the same time the two housing parts are secured to one another by the locking device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a filter device having a filter element insertable into a filter housing and a locking device connecting the filter element to the housing as disclosed herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows an air filter 1 in section, comprised of a housing 2 with a housing bottom part 3 and a housing top part 4 as well as a filter element 5 that is received in the interior of the housing 2. The filter element 5 comprises a filter medium 6 through which the fluid to be filtered flows and a filter frame 7 that frames the filter medium 6 and secures the filter element 5 in the desired position within the housing 2. Moreover, the filter frame 7 serves as a support for a sealing element 15, in particular a sealing ring, that is arranged on the outer side of the filter frame 7, viewed in radial direction, and rests against the inner wall of the filter housing and ensures a flow-tight separation of the unfiltered and filtered side of the filter element.

The filter medium 6 is, for example, embodied as a zigzag-folded filter paper or as a filter nonwoven or the like.

For securing the filter element 5 in the interior of the housing 2, on the one hand, and for connecting the two housing parts 3 and 4, on the other hand, a locking device 8 is provided that comprises a locking element 9 on the filter element 5 and locking eyes 13, 14 on the housing parts 3, 4, wherein the locking eyes 13 are arranged on the housing bottom part 3 and the locking eyes 14 are arranged on the housing top part 4. The locking element 9 is formed integrally with the filter frame 7 of the filter element 5, wherein filter frame 7 and locking element 9 expediently are comprised of plastic or synthetic material and are injection-molded onto the filter medium.

The locking element 9 comprises a hook support 10 that is connected to the filter frame 7 and branches radially in the outward direction and two detent hooks 11 and 12 that are arranged on the radial outer side of the hook support 10 and are integrally formed with the hook support 10. Relative to the separation plane between the housing parts 3 and 4 in which separation plane the hook support 10 is positioned also, the detent hooks 11 and 12 are bent downwardly and upwardly, respectively, and project form-fittingly into the locking eyes 13 and 14 on the housing part 3 or the housing part 4. The connection between the detent hooks 11 and 12 and the locking eyes 13 or 14 is embodied as a snap-on connection in that the detent hooks, by utilizing their elasticity, are inserted into the locking eyes and are engaged therein by means of a form-fitting locking connection with respect to a release direction between the housing parts 3 and 4. In the locked position illustrated in FIG. 1 an angled end section at the end face of each detent hook 11 or 12 is positioned immediately on the edge of each locking eye 13 or 14 so that in the release direction the form-fitting action is realized. As a result of their own elasticity snapping into place of the detent hooks in the locking eyes can be realized as well as a release of the snap-on or locking connection in order to be able to release the housing parts 3 and 4 from one another, for example, for exchanging the filter element in the course of servicing.

The described locking device 8 has the advantage that no additional connecting elements going beyond this connection are required for fixation of the housing top part on the housing bottom part. Moreover, fixation elements are no longer needed that secure the filter element 5 in the interior of the housing 2 in the desired position. Both functions, i.e., securing of the filter element in the housing as well as the connection of the two housing parts with one another are performed by means of the common locking device. The locking device 8 is located on the exterior of the housing and is thus accessible from the exterior so that also a release of the locking device is easily possible.

It may be expedient to provide on the end face of one of the housing parts, for example, on the end face of the housing top part 4, grooves for receiving the hook support 10 in order to ensure that in the assembled position the end faces of both housing parts 3 and 4 rest flat against one another and in this way provide a seal-tight connection.

Figure 2:
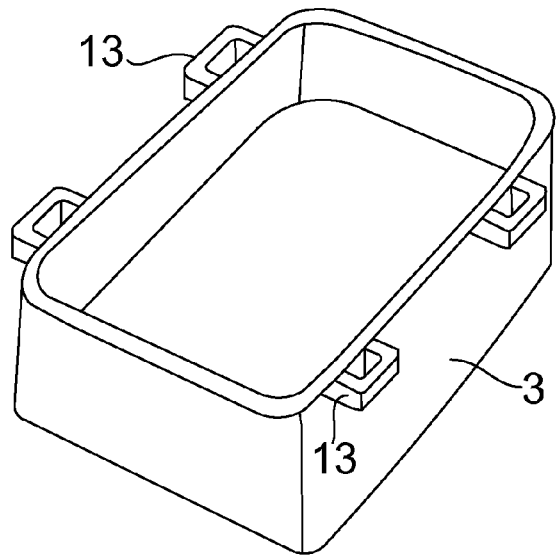
FIG. 2 shows a perspective view of the housing bottom part.

As can be seen in FIG. 2, the locking eyes 13 on the housing bottom part 3 are positioned adjacent to the end face of the housing bottom part 3 onto which the end face of the housing top part 4 is to be placed. Expediently, the topside of the locking eyes 13 is positioned slightly below the end face; in the same way the locking eyes 14 of the housing top part 4 are positioned also at a minimal axial spacing relative to the end face of the housing top part 4 so that in the assembled position (FIG. 1) the looking eyes 13 and 14 have a minimum spacing to one another that enables insertion of the detent hooks 11 and 12 of the locking element 9.

Figure 3:
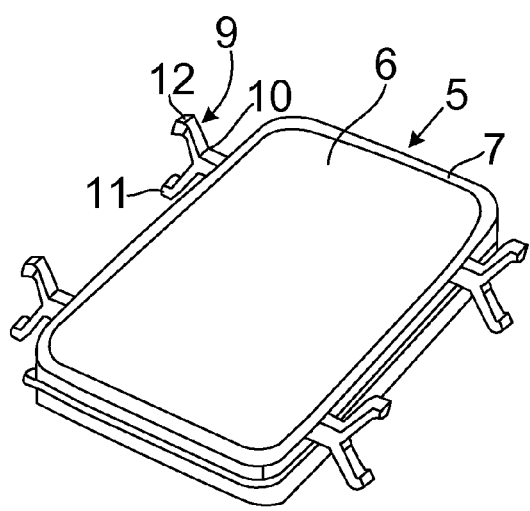
FIG. 3 shows a perspective view of the filter element with the filter medium framed by a filter frame wherein on the filter frame locking elements in the form of detent hooks are integrally formed by injection molding.

As can be seen in FIG. 2 in connection with FIG. 3, the basic cross-section of the air filter is rectangular wherein on the opposed longitudinal sides of the housing two locking eyes each are arranged and therefore on the opposite longitudinal sides of the filter element 5 two locking elements 9 with detent hooks 11 and 12 are positioned. The narrow sides of the housing or of the filter element do not have any locking devices.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:
1. A filter device comprising:
a housing comprised of
    a housing bottom part and
    housing top part;
a filter element removeably inserted into said housing, said filter element releaseably securing said housing bottom part and said housing top part together by a releasable locking connection, said filter element comprising:
    a filter medium;
    a locking element arranged on the circumference of said filter element and secured to said filter medium, said locking element a component of a locking device forming said releasable locking connection;
wherein said locking element of said filter element engages said housing bottom part and said housing top part to form said releasable locking connection providing fixation of said housing bottom part onto said housing top part with said filter element inserted therebetween;
wherein said releasable locking connection is releasable to release said housing bottom part and said housing top part from one another to exchange said filter element;
wherein said locking element of said filter element is arranged at an exterior of said housing;
wherein said locking element includes
    a hook support connected at one end to said filter element and extending in a radial outwards direction from said filter element;
    two detent hooks secured to radially outer end of said hook support,
        a first one of said detent hooks bent downwardly relative to a separation plane between said housing top and bottom parts; and
        a second on of said detent hooks extending upwardly relative to said separation plane;
    wherein said detent hooks on said hook support form a Y-shape locking element extending radially outwards from said filter element;
wherein said releasable locking connection further comprises:
    locking parts secured onto an exterior of said housing bottom part and said housing to part, respectively;
    wherein said locking parts on said housing parts each include a locking eye having an eye aperture extending therethrough;
    wherein said first detent hook of said locking element is inserted into and extends through said eye aperture of a respective one of said locking eyes of one of said housing parts to releaseably and lockably engage said respective locking eye;

wherein said second detent hook of said locking element is inserted into and extends through said eye aperture of a different respective one of said locking eyes of a different one of said housing parts to releaseably and lockably engage said different respective locking eye.

2. The filter device according to claim 1, wherein
said locking element is integrally formed with said filter element and
said locking parts each are integrally formed on said housing bottom part and said housing top part, respectively.

3. The filter device according to claim 2, wherein
said locking element and said locking parts are embodied as plastic parts that are injection-molded onto said filter element, said housing bottom part, and said housing top part, respectively.

4. The filter device according to claim 1, wherein
said locking element and said locking parts are arranged on an exterior of said filter element and an exterior of said housing bottom part and said housing top part, respectively.

5. The filter device according to claim 4, wherein
at an end face of said housing bottom part and at an end face of said housing top part a groove is provided, respectively, for receiving said locking element arranged on said filter element such that said locking element extends in said groove through said housing from said filter element at an interior of said housing radially outwardly to said exterior of said housing, said groove receiving said locking element allowing end faces of both housing parts to rest against one another providing a seal-tight connection.

6. The filter device according to claim 4, wherein
at an end face of said housing bottom part or at an end face of said housing top part a groove is provided, respectively, for receiving said locking element arranged on said filter element.

7. The filter device according to claim 1, wherein
several of said locking elements are provided on opposed lateral edges of said filter element and
wherein several of said locking parts are arranged in a matching position relative to several locking elements on opposed lateral edges of said housing bottom part and said housing top part.

8. The filter device according to claim 1, wherein
said filter element has a filter frame that frames said filter medium.

9. The filter device according to claim 8, wherein
said locking element is arranged on said filter frame.

10. The filter device according to claim 1, wherein
said locking element on said filter element is a support for a sealing element.

\* \* \* \* \*